United States Patent [19]

Stice

[11] Patent Number: 4,739,748

[45] Date of Patent: Apr. 26, 1988

[54] SOLAR COLLECTOR STORAGE SYSTEM AND METHOD

[76] Inventor: James D. Stice, 80 Utica St., Clinton, N.Y. 13323

[21] Appl. No.: 401,622

[22] Filed: Jul. 26, 1982

Related U.S. Application Data

[60] Division of Ser. No. 194,675, Oct. 6, 1980, abandoned, which is a continuation of Ser. No. 905,843, May 15, 1978, abandoned.

[51] Int. Cl.⁴ .............................................. F24J 3/02
[52] U.S. Cl. .................................... 126/430; 126/417; 126/429; 126/450
[58] Field of Search ............... 126/430, 417, 436, 428, 126/429, 450; 165/104, 48 S; 160/232, 236, 229 R, 229 B, 177

[56] References Cited

U.S. PATENT DOCUMENTS

| | | | |
|---|---|---|---|
| 2,288,465 | 6/1942 | Knudsen | 126/428 X |
| 2,595,905 | 5/1952 | Telkes | 126/419 |
| 2,857,634 | 10/1958 | Garbade et al. | 126/419 X |
| 4,050,443 | 9/1977 | Peck et al. | 126/432 X |
| 4,143,640 | 3/1979 | Pierce | 126/424 |
| 4,144,131 | 3/1979 | Medico, Jr. | 126/441 X |
| 4,212,289 | 7/1980 | Hebert | 126/428 |
| 4,290,416 | 9/1981 | Maloney | 126/428 X |

Primary Examiner—Larry Jones

[57] ABSTRACT

A plurality of collector panels are mounted so as to be rotatable in unison about their longitudinal axes. One side or face of each panel is provided with a radiation absorbing surface and the other side or face is provided with a radiation reflective surface. Each panel includes a compartmentalized plastic tray in which is encapsulated thermal storage or phase change material having an appropriate heat of fusion so that radiation striking the absorptive surface will be stored in the material for subsequent release. Owing to the rotatability of the various panels, when mounted adjacent a conventional window, they can be adjusted or tilted so as to control the temperature of a room. Flexible seals are attached to the edges of the panels so as to block the flow of air between the panels when the panels are closed, that is, with the radiation surface facing either outwardly or inwardly.

5 Claims, 3 Drawing Sheets

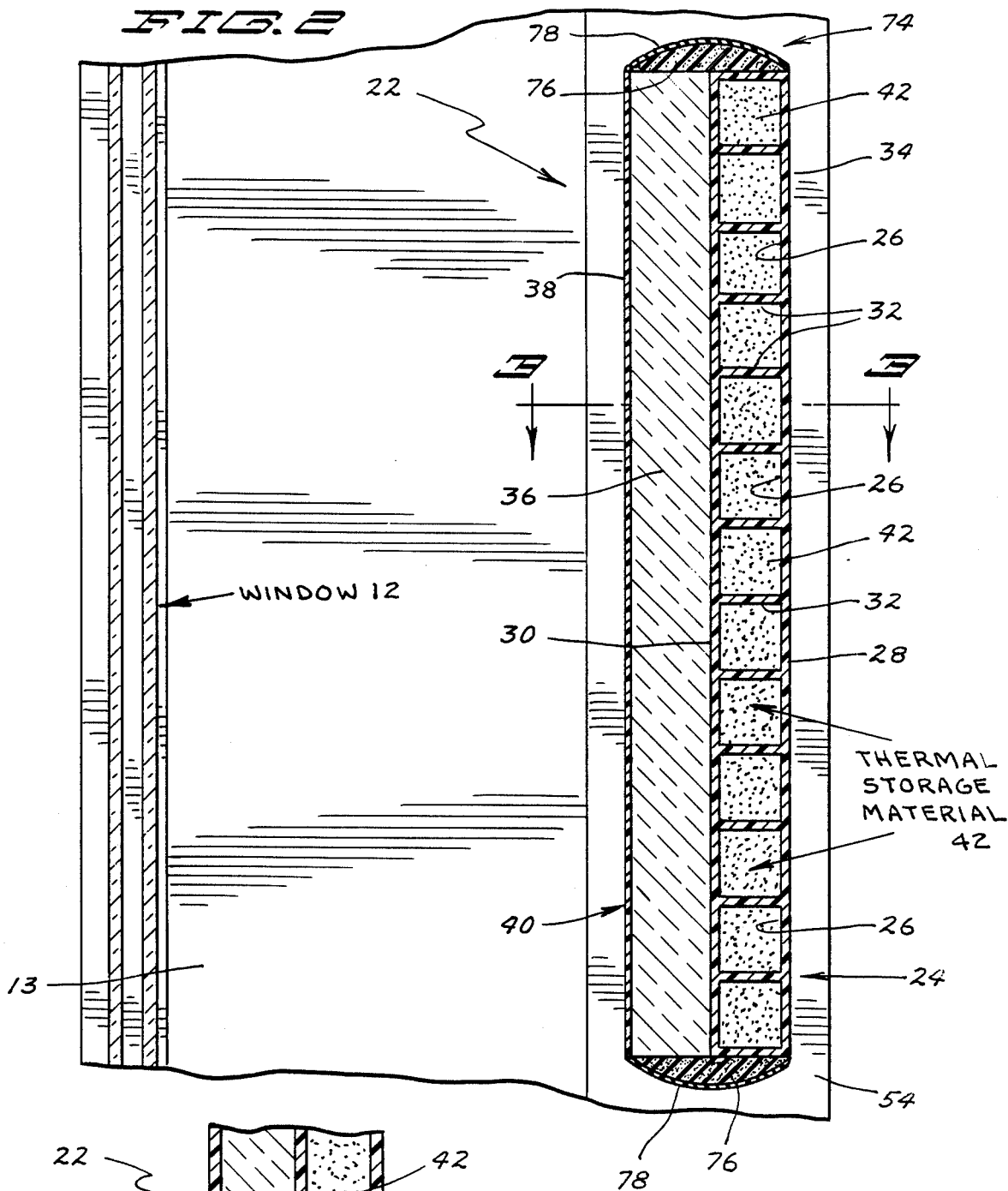
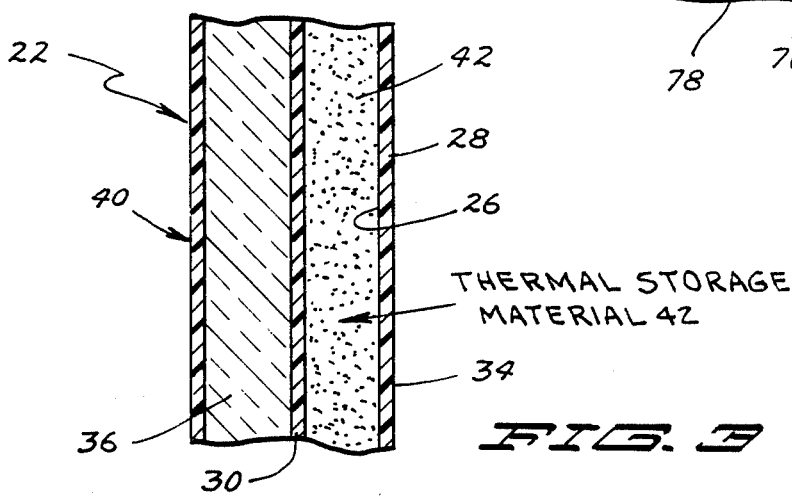

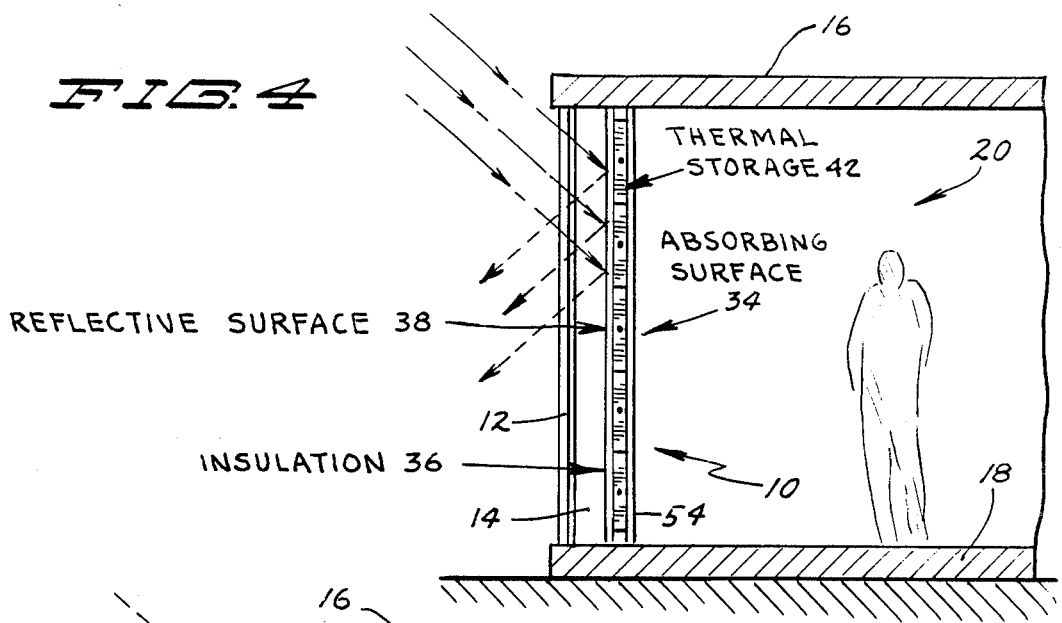
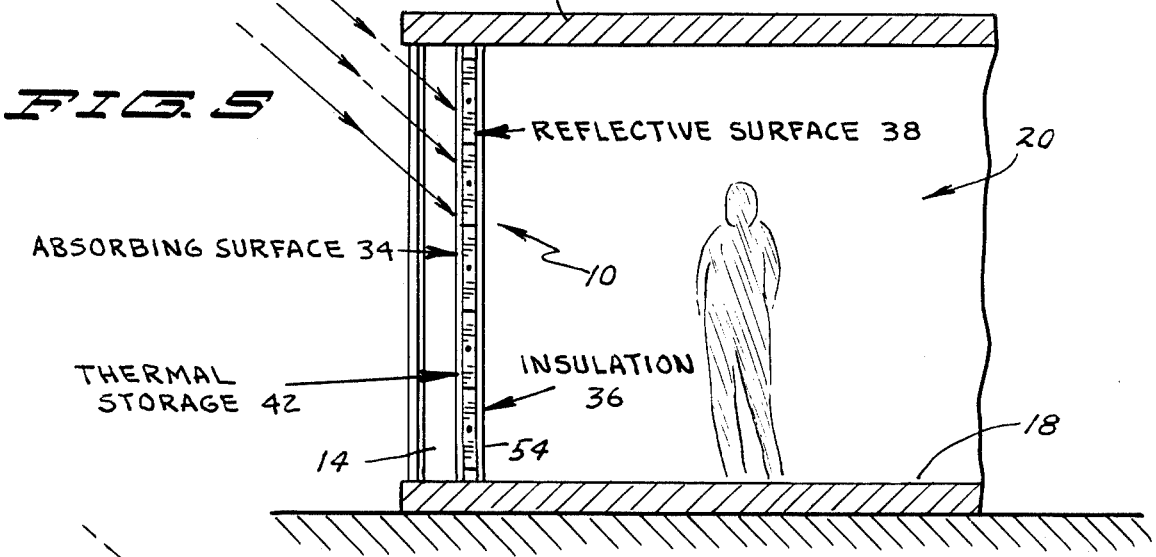
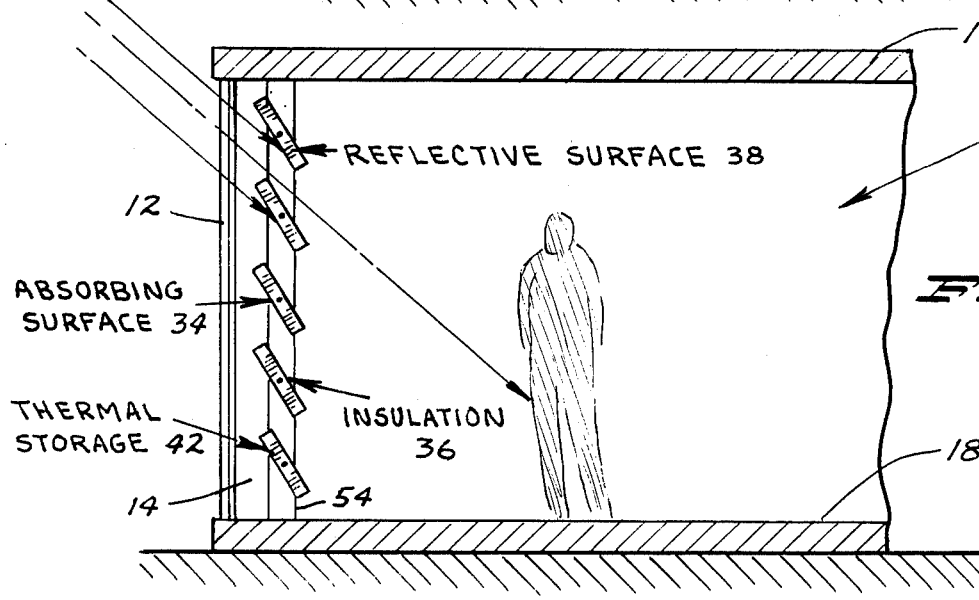

SOLAR COLLECTOR STORAGE SYSTEM AND METHOD

CROSS-REFERENCE TO RELATED APPLICATION

This is a division of my application Ser. No. 194,675, filed Oct. 6, 1980, now abandoned, which is a continuation of my application Ser. No. 905,843, filed May 15, 1978 now abandoned for SOLAR COLLECTOR STORAGE SYSTEM AND METHOD.

BACKGROUND OF THE INVENTION

This invention relates to radiation conversion systems, and pertains more particularly to a passive system utilizing a plurality of collector panels that can be oriented in different angular positions for controlling the receipt and release of thermal energy.

DESCRIPTION OF THE PRIOR ART

Both active and passive solar systems have been devised. An active system utilizes mechanical power to move the heat within a building, whereas a passive system requires no mechanical power, utilizing instead natural flow patterns to deliver the heat into a room.

U.S. Pat. No. 2,595,905, granted May 6, 1952 to Maria Telkes, for RADIANT ENERGY HEAT TRANSFER DEVICE depicts a passive system employing a hollow metallic cell containing therein a phase change or thermal storage material that absorbs and releases latent heat. A venetian blind-type shutter is mounted at each side or face of the cell, either or both of which can be adjusted so as to shield the cell from radiant energy or to control the release of stored energy. Consequently, any solar radiation coming through the window with which the cell is associated can absorb heat from such radiation for later release. The cell is fixedly mounted and by necessity is opaque so no visible light can pass therethrough. Consequently, no one can see through the window, and no light can enter the room through the window. Also, no air can pass by the cell, even though the window is of a type that can be opened.

Other passive systems have been devised in which the storage material is placed in the floor of the room. Obviously, the presence of carpeting interferes with the functioning of systems of this character. These systems lack temperature control, overheating being a common problem. A heat insulation panel, which is swung upwardly from a horizontal or out-of-registry position, is sometimes used to reduce heat losses.

Another passive system makes use of a storage panel within a room that is simply placed in front of the window. Here again a movable heat insulation panel on the outside of the building can be used to control the effectiveness of the thermal storage.

Still another passive system reflects the radiant energy transmitted through a window upwardly to a storage panel on the ceiling of the room.

SUMMARY OF THE INVENTION

One object of the invention is to provide a passive system that is considerably less costly than a comparable active system, and also less costly than other passive systems.

Another object of the invention is to provide a passive system involving good heat and temperature control.

Another object is to provide a thermal storage system embodying glare control as well.

A further object is to provide a system of the foregoing character that is compact, requiring but little space.

Still further, an object is to provide a system that is light weight and readily mounted in relation with a conventional window.

Yet another object of the invention is to provide a system that will last indefinitely with little or no attention. In this regard, it is anticipated that the rotation of the various horizontal panels will maintain a high level of performance throughout the life of the system by mixing the phase change or thermal storage material when repeatedly converted to liquid form and vice versa.

Still another object is to provide a system in which natural ventilation can be realized when my system is used with a window that can be opened and closed.

Also, an object is to provide a system that will be aesthetically pleasing and will not detract from the decor of the room to any significant degree.

Briefly, my invention is concerned with a passive heating system in which a plurality of collector panels are rotably mounted in an adjacent relation. Each panel contains therein a thermal storage medium or phase change material having a desired latent heat of fusion so that it melts at temperatures slightly above room temperature. The panel has a radiation absorbing surface so that when radiation strikes the absorbing surface heat is transmitted to and stored in the thermal storage medium. A layer of thermal insulation is applied to the side of the thermal storage medium remote from the absorptive surface. A radiation reflective surface is provided on the thermal insulation, facing in an opposite direction from the absorbing surface.

Various operating modes can be effected by simply angularly moving the various panels in unison so as to cause the absorbing surface to face the window and hence the sun or conversely face the room, depending upon which direction radiation is arriving from at a particular time. In between positions are also readily available so that an optimum heating or cooling of the room is obtainable.

The rotatable panels have their edges provided with resilient seals so as to minimize any leakage of air between panels when the panels are in a planar or closed condition, yet permit circulation of air when the panels are tilted or inclined to provide spaces therebetween.

BRIEF DESCRIPTION OF THE DRAWINGS

FIG. 1 is a front elevational view of my system, the view looking outwardly from the interior of a room;

FIG. 3 is a sectional view taken in the direction of line 3—3 of FIG. 2, the view being on the same scale as that of FIG. 2;

FIG. 4 is a schematic diagram taken in the same direction as line 4—4 of FIG. 1 showing all of the panels, the panels being angularly oriented so that all of their absorbing surfaces face inwardly toward the room and the reflective surfaces outwardly toward the window and hence toward the sun;

FIG. 5 corresponds to FIG. 4 but with the panels rotated through 180° so that the absorbing surfaces face outwardly and reflective surfaces inwardly, and FIG. 6 is still another view corresponding generally to FIGS. 4 and 5 but with the panels tilted so as to provide still another operating mode.

DESRIPTION OF THE PREFERRED EMBODIMENT

Figure 2:
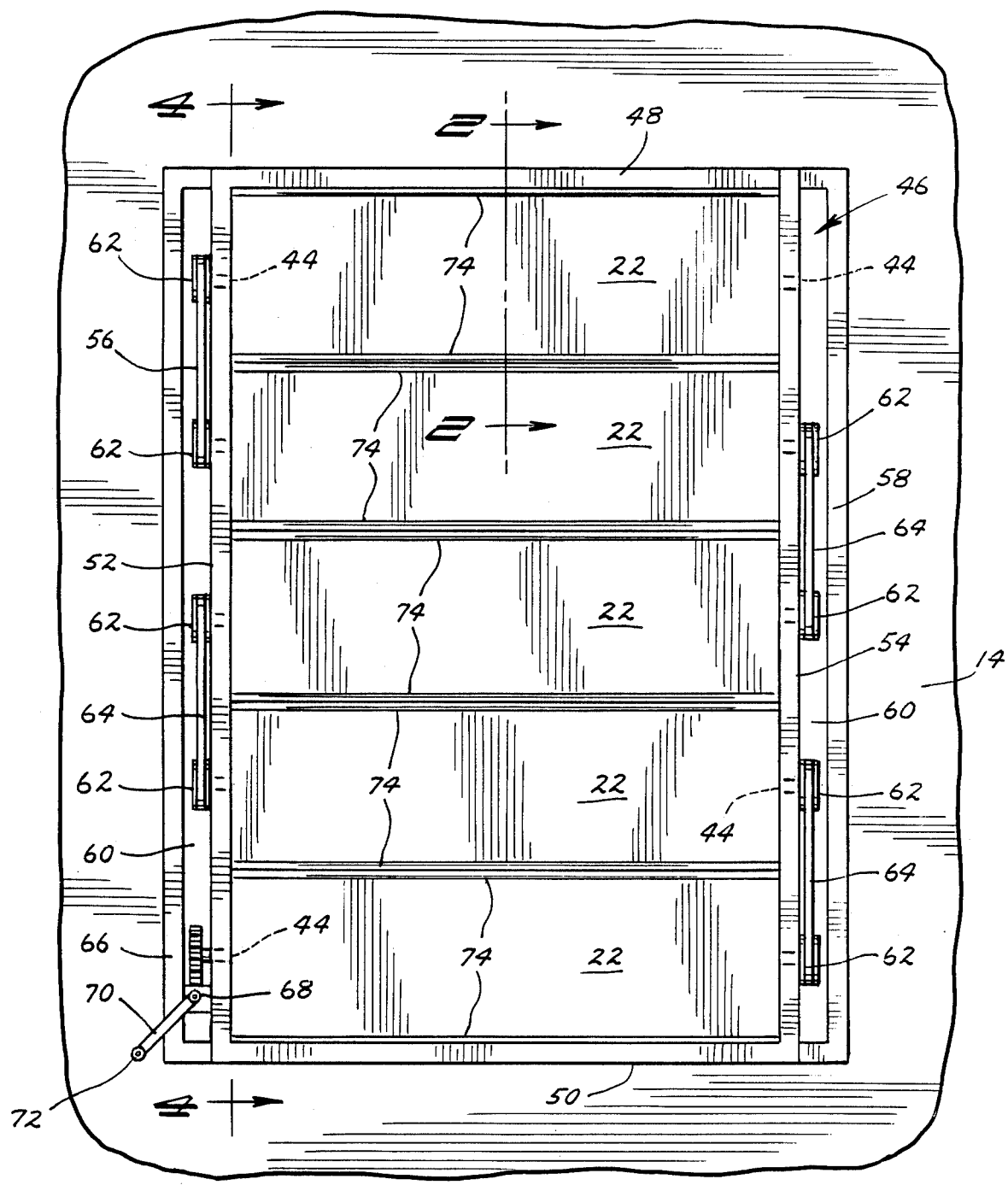
FIG. 2 is an enlarged sectional view taken in the direction of line 2—2 of FIG. 1 for the purpose of showing the interior of one of the panels.

My solar collector storage system has been denoted generally by the reference numeral 10. From FIG. 2 (and also FIGS. 4, 5 and 6) it will be seen that my system 10 is installed in a slightly spaced relation with respect to a double-glazed window 12 mounted in a window frame 13 (FIG. 2). More specifically, the window 12 faces, or preferably faces, in a southerly direction so as to receive as much solar radiation as possible. A portion of the outer wall 14 containing the window 12 therein has been depicted. Although not shown in FIG. 1, a ceiling of 16 and floor 18 have been illustrated in the rather diagrammatically presented FIGS. 4–6. Although the wall 14 containing the window 12 is not shown in FIGS. 4–6 (the wall 14 being omitted in order to reduce the size of these three figures), it will be appreciated that the wall 14, the window 12, the ceiling 16 and the floor 18 form three sides of a room 20.

Describing the system 10 in greater detail, it is to be observed that it comprises a plurality of collector panels 22. In the illustrated situation, five such panels 22 have been shown. Of course, the number of panels 22 and also the dimensions thereof will depend largely upon the size of window 12 with which my system 10 is to be employed.

Each panel 22 comprises a plastic tray 24, such as polycarbonate, which can be fabricated in one piece by suitable molding and/or extruding techniques. As best understood from FIG. 2, the tray 24 is provided with a number of individual compartments 26. In this regard, the compartments 26 are formed by parallel plastic sections or plates 28 and 30 and longitudinally directed partitions or dividers 32. Hence, the plate 28 forms one side or face 34 of the panel 22. The face 34 of the plate 28 is rendered radiant absorbing by reason of dark paint, preferably a flat black paint. However, other relatively dark colors can be used which will harmonize with the decor of the room in which my system 10 is installed.

Each panel 22 further includes a layer 36 of thermal insulation, such as polyurethane, the insulation 36 being adhered to the plate 30 of the tray 24. Whereas the side or face 34 is radiation absorbing, the opposite side or face 38 of the panel 22 is made radiation reflective. More specifically, a metallized plastic film 40 can be applied to the thermal insulation 36 to provide the radiation reflective face 38.

Playing an important role in the practicing of my invention is the effective utilization of thermal storage or phase change material having an appropriate latent heat of fusion. The previously alluded to U.S. Pat. No. 2,595,905 lists a number of appropriate materials. Of those listed, sodium sulfate decahydrate ($Na_2SO_4.10-H_2O$) has been performed admirably well in actual practice. Although the term "heat of fusion" is generally well-known, it can be pointed out that the quantity of heat required per unit mass without any change of temperature is the heat of fusion of the particular substance. Thus, a thermal storage material of the envisaged type will cease to cool for a time at its melting point but will continue to give out heat as it solidifies. When it has congealed or become solid, it begins to cool once more. The process is reversible and use is made of this reversibility in absorbing and dissipating heat when practicing my invention. The thermal storage 42 is encapsulated or confirmed in the various compartments 26.

Inasmuch as the array of panels 22 should be capable of being rotated through 180° so as to completely reverse the position of the absorbing and reflective surfaces 34, 38, each panel 22 is provided with oppositely directed stub shafts or pins 44. These shafts or pins 44 are attached directly to appropriate portions of the tray 24 in each instance. The shafts 44 are journaled in a rectangular frame 46 having top, bottom and side members 48, 50, 52 and 54, respectively, the members 52 and 54 serving as the actual support for the various shafts 44.

In the particular construction that has been selected to show the mounting of the panels 22, additional frame members 56 and 58 are spaced laterally from the side members 52, 54 of the frame 46 to provide a vertical space 60 at each side of the frame 46 into which the shafts 44 project.

As can be observed in FIG. 1, the shafts 44 for the top two panels 22 have pulleys 62 thereon and a drive belt 64 is entrained about these pulleys. In a similar manner, the second from the top panel 22 and the third from the top panel 22 have pulleys 62 at the right and another belt 64 is entrained about these pulleys. The third from the top panel 22 and the second from the bottom panel 22 have additional pulleys 62 at the left ends of their shafts 44 and still another belt 64 is entrained about these last-mentioned pulleys. The next to the bottom and the bottom panels 22 have on their stub shafts 44 at the right still additional pulleys 62 with a belt 64 entrained thereabout. The stub shaft 44 on the lowermost panel 22 has a worm gear 66 thereon which is engaged by a threaded screw 68 operated by a crank 70 having a handle 72. In this way, when the crank 70 is rotated, the screw 68 causes the worm gear 66 to rotate so as to tilt the lowermost panel 22. The tilting action is transmitted to the panel 22 next above through the agency of the pulleys 62 and belt 64 at the right and so on through the entire array or assemblage of panels 22.

It will be appreciated that while pulleys 62 and belts 64 have been illustrated, sprockets and chains can be substituted therefor, and in some installations will possess practical advantages over the simpler belt drive. However, the belt and pulley arrangement lends itself more readily to a simpler portrayal.

Inasmuch as the space between the panels 22 and the window 12 should at times be completely sealed in order to achieve the best utilization of my system 10, it is planned that resilient seals 74 be attached to the edges of the various panels. From FIG. 2, it will be noted that the seals 74 at the top and bottom have been made quite simple. In this regard, segments of readily compressible foam rubber 76 have been secured to the upper and lower edges of the panel 22 and flexible rubber membrane 78 overlie the foamed rubber in each instance to provide a seal 74 at the top and a similar seal 74 at the bottom. The seals 74 being quite resilient and compressible, assure good sealing action at the upper and lower edges of each panel 22.

Having presented the foregoing description, the manner in which my method is practiced and the way in which the system 10 functions should be readily understood. Nonetheless, a brief description of several modes of operation will be helpful in appreciating the full benefits to be derived from a practicing of my invention.

In this regard, FIG. 4 represents two operational modes. The first can be considered to be during the heating season when the heat loss through the window 12 is greater than the solar gain. Consequently, the crank 70 is rotated so as to position the panels 22 in a completely closed or planar relationship with the reflective surfaces 38 facing outwardly or toward the window 12. The absorptive surfaces 34 face inwardly toward the room under these conditions. If the thermal storage material 42 has heat stored therein and assuming the room 22 requires heating, then the stored heat will be released or dissipated via the absorbing surfaces 34 into the room 20 to help raise the room temperature.

The second operational mode for FIG. 4 would be during the cooling season. Assuming that the temperature of the room 20 is higher than that of the thermal storage medium 42, then radiation from the room 20 will be picked up by the absorbing surfaces 34 and transmitted to the thermal storage medium 42. In other words, heat is absorbed by convective heat transfer from the warm air in the room 20. As already explained, the thermal storage medium is contained in the compartments 26 of each tray 24, each panel containing a tray, of course. By the same token, the reflective surfaces 38 will reflect solar radiation impinging thereon so that such sun-derived energy will not be transmitted into the room 20.

FIG. 5 illustrates a situation where it is advantageous to be collecting solar radiation. Therefore, in this situation the absorbing surface 34 of each panel 22 faces outwardly or toward the window 12 and the reflective surface 38 of each panel 22 faces inwardly toward the room 20. This mode, as represented by FIG. 5, could very well precede the mode pictured in FIG. 4. In other words, when the thermal storage material 42 has stored thermal energy by reason of solar radiation striking the outwardly facing absorbing surfaces 34, then, such as when night falls, the mode shown in FIG. 4 can be resorted to so that the thermal storage material 42 releases heat into the room 20 via the absorbing surfaces 34 which, under these circumstances, face inwardly toward the room.

Of course, when the room temperature is higher than desired, then the heat would be absorbed and retained in the storage material 42 as far as FIG. 4 is concerned, could be released via radiation by then rotating the panels 22 into the planar or closed condition shown in FIG. 5. For the system 10 to be effective when operating in this mode, the window 12 should be removed or opened, in order to facilitate the radiation of heat from the panels 22. This mode is really concerned with a cooling cycle because heat collected from the room 20 during the day would be dissipated to the atmosphere outside during evening hours.

Turning to the mode represented in FIG. 6, it will be recognized that this mode is utilized when the room 20 requires immediate heat and solar energy is at that moment available. A portion of the solar radiation passes into the room 20 between the now tilted or inclined panels 22, thereby heating the room's interior. Solar radiation intercepted by the absorbing surfaces 34 of the panels 22 is stored through the agency of the thermal storage material 42 and passed into the room 20 by convective heat transfer. Consequently, the amount of heat transferred into the room 20 when employing the mode of FIG. 6 will depend upon the tilt angle. The greater the tilt angle, the more solar radiation that is allowed to pass into the room 20 between the inclined panels 22. The maximum amount of solar radiation is, of course, permitted to enter the room 20 when the tilt angle is such as to make the panels 22 parallel to the incoming rays from the sun. Where the angle is reduced, then a greater amount of solar radiation is blocked or interrupted.

One nicety about the mode of FIG. 6 is that natural light from the outside can also be controlled by using different tilt angles. This is quite an advantage and is not easily obtainable with other passive heating systems utilizing solar energy.

It is expected that my system will not necessarily be used constantly throughout the year in the collection of solar radiation. Obviously, the percentage of overcast or cloudy days varies appreciably from geographical location to geographical location. It is on cloudy days that the insulating capabilities, obtained from the insulation layer 36, of the panels 22 will be of most benefit. Not only will the panels 22 find considerable utility on cloudy days, that is at times when the insulation levels do not warrant any need for storage, the panels 22 possess the capability to store energy provided by the sun when it is available and to insulate the room during the night, dissipating whatever heat has been picked up from the sun during the day. Consequently, it is readily apparent that my system possesses a considerable amount of versatility.

I claim:

1. A solar collector storage system comprising a plurality of panels having first and second generally parallel spaced plates, each panel containing therein a phase change material between said first and second plates, heat insulation material confronting said second plate, said first plate having a radiation absorptive surface adjacent its outer side, a window, means mounting said panels for rotation about parallel axes to cause absorptive surfaces of said panels to face said window or face away from said window, and means sealing said panels when said absorptive surfaces face either toward said window or away from said window.

2. A solar collector storage system in accordance with claim 1 in which sealing means is resilient.

3. A solar collector storage system in accordance with claim 2 including means for rotating said panels about their axes in unison to cause said absorptive surfaces to face said window or away from said window.

4. A solar collector storage system comprising a plurality of panels having first and second generally parallel spaced plates, said plates having first sides facing toward each other forming a space therebetween and second sides facing away from each other, each panel containing therein a phase change material in said space between said first sides of said first and second plates, heat insulation material having one side confronting the second side of said second plate, said first plate having a radiation absorptive surface on its said second side, and means mounting said panels for rotation about parallel axes so that said panels can be rotated from heat absorbing position in which said second side of said first plate faces toward a hear source to a heat dissipating position in which said second side of said first plate faces in a direction in which heat is to be released, means for rotating said panels about their axes in unison, said axes being midway between the longitudinal edges of said panels and said axes being spaced from each other a distance corresponding substantially to the distance between the longitudinal edges of a panel, means sealing the longitudinal edges of adjacent panels when said panels are rotated into closed or substantially planar relation.

5. A solar collector storage system in accordance with claim 4 in which said sealing means is resilient.

* * * * *